(12) United States Patent
Lukowski, Jr.

(10) Patent No.: US 9,140,283 B2
(45) Date of Patent: Sep. 22, 2015

(54) ADHESIVELY-BONDED STRUCTURAL COMPOSITE JOINT UTILIZING SHOULDER-CENTERED SLEEVES

(75) Inventor: Florian P. Lukowski, Jr., El Segundo, CA (US)

(73) Assignee: Raytheon Company, Waltham, MA (US)

( * ) Notice: Subject to any disclaimer, the term of this patent is extended or adjusted under 35 U.S.C. 154(b) by 895 days.

(21) Appl. No.: 12/945,548

(22) Filed: Nov. 12, 2010

(65) Prior Publication Data

US 2012/0118531 A1  May 17, 2012

(51) Int. Cl.
| | |
|---|---|
| F16B 11/00 | (2006.01) |
| F16B 2/02 | (2006.01) |
| F16L 13/007 | (2006.01) |
| F16L 47/24 | (2006.01) |
| F16L 13/10 | (2006.01) |

(52) U.S. Cl.
CPC ............... *F16B 11/006* (2013.01); *F16B 2/02* (2013.01); *F16L 13/007* (2013.01); *F16L 13/103* (2013.01); *F16L 47/24* (2013.01); *F28F 2275/025* (2013.01); *Y10T 29/49947* (2015.01); *Y10T 403/471* (2015.01); *Y10T 403/472* (2015.01); *Y10T 403/7062* (2015.01); *Y10T 403/7073* (2015.01)

(58) Field of Classification Search
CPC .......... F16B 11/00; F16B 11/006; F16B 5/00; F16B 5/06; F16B 2/02; F16B 2/04; F16B 11/008; F16B 17/00; F28F 2275/025; F28F 9/007; F16L 47/14; F16L 47/24; F16L 13/103; F16L 13/007

USPC .............. 403/265, 266, 267, 268, 375, 373; 428/59, 61, 60, 62; 156/304.2, 304.3; 285/416

See application file for complete search history.

(56) References Cited

U.S. PATENT DOCUMENTS

| | | | | |
|---|---|---|---|---|
| 2,373,808 | A | * | 4/1945 | Brown ............................ 52/471 |
| 2,769,648 | A | * | 11/1956 | Herman ........................ 285/110 |
| 3,189,371 | A | * | 6/1965 | Swan ............................... 285/55 |
| 3,307,862 | A | * | 3/1967 | Brown .......................... 285/364 |
| 3,702,199 | A | * | 11/1972 | Brooks et al. .................. 285/55 |
| 3,977,704 | A | * | 8/1976 | Meyer ............................. 285/27 |
| 4,252,349 | A | | 2/1981 | Mahoff |
| 4,619,470 | A | * | 10/1986 | Overath et al. ................. 285/55 |
| 4,702,637 | A | * | 10/1987 | Muellenberg ................. 403/373 |
| 4,773,282 | A | * | 9/1988 | Benton et al. ............... 74/579 R |
| 4,810,010 | A | * | 3/1989 | Jones ............................... 285/55 |

(Continued)

FOREIGN PATENT DOCUMENTS

GB          2 281 950 A          3/1995

OTHER PUBLICATIONS

Extended European Search Report in corresponding Application No. 11184841.2 dated May 11, 2015.

*Primary Examiner* — Daniel P Stodola
*Assistant Examiner* — Matthew R McMahon
(74) *Attorney, Agent, or Firm* — Renner, Otto, Boisselle & Sklar, LLP

(57) ABSTRACT

A composite joint includes a first member having a groove therein, a second member adjacent to the first member, and a connector member disposed between the second member and the first member. The connector member is received in the groove so as to bias a load path between the first member and the second member from a peripheral portion to a central portion of the connector member.

8 Claims, 7 Drawing Sheets

(56) References Cited

U.S. PATENT DOCUMENTS

| | | | |
|---|---|---|---|
| 4,865,356 A | 9/1989 | Moore et al. | |
| 5,224,738 A * | 7/1993 | Taga | 285/14 |
| 5,287,988 A * | 2/1994 | Murray | 220/589 |
| 5,413,389 A * | 5/1995 | Schlicht | 285/363 |
| 5,601,494 A | 2/1997 | Duggan | |
| 5,665,187 A * | 9/1997 | Mackellar | 156/91 |
| 5,961,154 A * | 10/1999 | Williams et al. | 285/22 |
| 6,874,543 B2 * | 4/2005 | Schmidt et al. | 139/383 R |
| 6,945,727 B2 * | 9/2005 | Christman et al. | 403/109.8 |
| 6,979,025 B2 * | 12/2005 | Conder et al. | 285/55 |
| 7,303,374 B2 | 12/2007 | Li et al. | |
| 7,306,692 B2 * | 12/2007 | Graham | 156/285 |
| 7,521,108 B2 * | 4/2009 | Franklin et al. | 428/119 |
| 7,712,993 B2 * | 5/2010 | Frisch et al. | 403/187 |
| 8,540,833 B2 * | 9/2013 | Deobald et al. | 156/180 |
| 2002/0029847 A1 * | 3/2002 | Matsui et al. | 156/306.9 |
| 2002/0053175 A1 * | 5/2002 | McKague et al. | 52/309.13 |
| 2004/0011927 A1 | 1/2004 | Christman et al. | |
| 2005/0064134 A1 | 3/2005 | Brantley et al. | |

* cited by examiner

Conventional Art

ADHESIVELY-BONDED STRUCTURAL COMPOSITE JOINT UTILIZING SHOULDER-CENTERED SLEEVES

GOVERNMENT RIGHTS

This invention was made with Government support under contract number 65349DGE2S awarded by Department Of Defense (DOD), Department Of Commerce (DOC), and National Aeronautics and Space Administration (NASA). The U.S. Government may have certain rights in this application.

BACKGROUND

The present disclosure relates to a composite joint of two adherents, either of the same or dissimilar materials, and a method for joining these adherents and a monopod device used in a cryoradiator that includes a metal and composite joint described herein.

Mechanical systems with very challenging performance goals require select materials (e.g., composite fiber reinforced laminates) with unique properties such as high strength, high stiffness, low thermal expansion, low thermal conductivity, etc. These select materials are utilized as key components in larger structural systems and therefore must be joined with adjacent members (typically made of dissimilar materials) to form composite joints. For example, such composite joints may include fiber reinforced laminates joined with adjacent metallic members. These composite joints typically use adhesives to bond the adjacent members or adherents together to properly transfer load.

Composite joints are necessary, and yet typically are the weakest link in the mechanical system. This is due to the fact that these composite joints are highly stressed. The high stress in the composite joint may be due to mismatches in thermal expansion properties and/or stiffness properties of the two adherents, extremely low temperature excursions (e.g., in cryogenic environments), thin composite members carrying high loads, and/or stress concentrations in transitional regions.

A typical composite joint which joins two members of different thicknesses and/or stiffnesses is shown in FIG. 1. It includes thicker or stiffer member M bonded to thinner or softer member C using adhesive A. FIG. 1. Also shows the load path L of an external load applied to member M. The external load applied to member M is transferred to member C via adhesive A.

The cryoradiator is a radiator that is configured to operate at very low temperatures and includes multiple thermal stages. Each stage is separated by a monopod that includes composite-to-metal joints. The monopod is an important component at the heart of the cryoradiator. The monopod includes thin-walled fiber-reinforced composite tubes bonded to metallic end fittings. The monopod functions both as a mechanical load path and a thermal isolator between the thermal stages of the radiator, which is operating at extremely cold temperatures. As a thermal isolator, the monopod provides a long path between the thermal stages of the radiator. The monopod is often designed to be compact enough to package it in tight confines.

The typical mismatched joint, where two adherents of different thicknesses/stiffnesses are bonded together, is not optimized for strength since it has (a) high stress concentrations at the leading edges of the adherents (where failure initiates) under mechanical loads and thermal-elastic loads and (b) high peel stresses (a typical failure mode for composite joints). The mismatched joint also provides many manufacturing problems (e.g., adhesive squeeze-out, voids, uncontrolled fillets, repeatability). When large members make up one or both of the adherents, the joint is very difficult to bond and align. Also, mechanical load-testing (i.e., at the part level) and non-destructive inspections are difficult to perform on the large members. Also, these mismatched joints make it difficult to develop consistent uniform bond line thicknesses which are critical to the joint's strength.

The present disclosure provides improvements over the prior art composite joints and/or methods for preparing such joints.

SUMMARY

One embodiment relates to a composite joint that includes a first member having a groove therein, a second member adjacent to the first member, and a connector member disposed between the second member and the first member. The connector member is received in the groove so as to bias a load path between the first member and the second member from a peripheral portion to a central portion of the connector member.

Another embodiment relates to a method for joining a first member with a second member. The method includes providing a first member having a groove therein; providing a second member adjacent to the first member; joining the first member with the second member using a connector member, the connector member being received in the groove; and using the connector member to bias a load path between the first member and the second member from a peripheral portion to a central portion of the connector member.

Yet, another embodiment relates to a monopod device used in a cryoradiator comprising a metal and composite joint described in the claim 1.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a composite joint with optimized structural strength or structural integrity. The present disclosure introduces a separate shoulder-centered sleeve that is adhesively-bonded to a thinner adherent in a controlled manufacturing environment. As shown in and explained (in detail) with respect to FIGS. 3 and 4, the present disclosure allows for structural tuning of the joint, specifically matching stiffnesses and coefficients of thermal expansion (CTE) of the two adherents (e.g., a shoulder-centered metallic sleeve and a fiber reinforced composite tube) to optimize the strength and fatigue life for both mechanical and thermal elastic loads. As will be explained in detail with respect to FIGS. 3 and 4, peak stresses at leading edges of the joint are also minimized. Peak stresses at the leading edges of the joint are minimized by providing smooth stiffnesses transitions and by moving load paths into the elastic trough (i.e., lowest point on the stress curve) of the joint, that is, away from the naturally high stress regions (i.e., at the edges of the joint). The joint also reduces peel stresses in the underlying adherents. In general, these peel stresses in the underlying adherents often cause failure of adhesively bonded composite joints.

Figure 2:
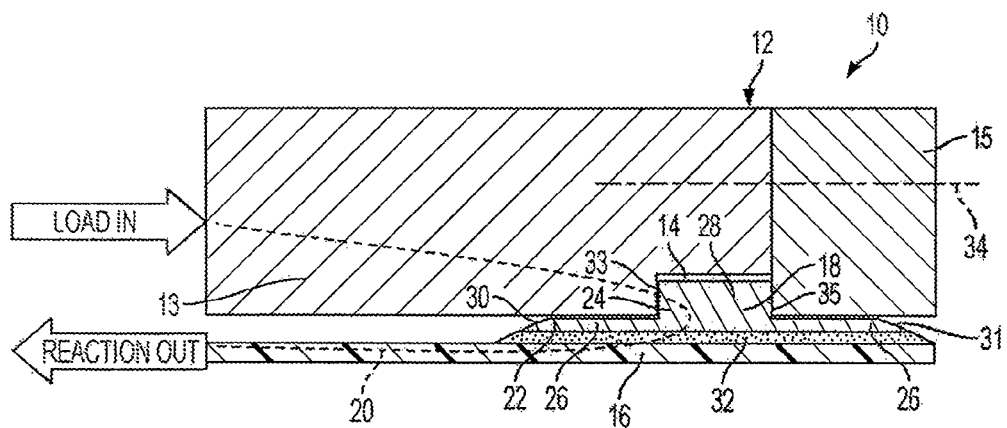
FIG. 2 illustrates a cross-sectional view of a composite joint in accordance with an embodiment of the present disclosure.

FIG. 2 shows composite joint 10 in accordance with an embodiment of the present disclosure. Composite joint 10 includes first member 12 having groove 14 therein, second member 16 adjacent to first member 12, and connector member 18 disposed between second member 16 and first member 12. Connector member 18 is received in groove 14 so as to bias load path 20 between first member 12 and second member 16 from peripheral portion 22 to central portion 24 of connector member 18. Connector member 18 is bonded to second member 16 using adhesive material 32. FIG. 2 is a cross-sectional view of either an axisymmetric (i.e., exhibiting cylindrical symmetry around a central axis thereof) or an orthogonally swept (i.e., representing a solid where the section is projected linearly and normal to the plane of the section) joint 10.

First member 12 includes clamping members 13 and 15 that are attached to each other using a fastener or clamping device (not shown). A center line of the fastener is shown by dotted line 34 in FIG. 2, as an example. Clamping members 13 and 15, when attached to each other, provide groove 14. In one embodiment, clamping members 13 and 15 are made from a steel material. In one embodiment, second member 16 may be made from carbon fiber-reinforced laminates. However, it is contemplated that first member 12 (clamping members 13 and 15) and second member 16 may be made of any material.

Groove 14 is formed in at least one of the clamping members 13 or 15. As will be explained below, groove 14 applies a preload to connector member 18 along a primary loading direction of joint 10.

Connector member 18 includes body portion 26 and raised portion 28 integral with body portion 26. Raised portion 28 of connector member 18 is received by groove 14 in first member 12. In one embodiment, raised portion 28 is in the form of a raised shoulder. In one embodiment, body portion 26 has an optimized thickness and length. In one embodiment, body portion 26 includes beveled edges 30 and 31 to help further reduce peak stresses.

Raised portion 28 is centered on body portion 26. Raised portion 28 is centered along a (fore-aft) primary loading direction on integral thin adherent or body portion 26 of joint 10. Under extreme temperature excursions (either high or low), the stress profile of the composite joint is symmetric about the center line of the joint. Therefore, it is most efficient to have raised portion 28 centered on body portion 26 and positioned away from the ends of the joint where the stresses are generally high. Alternatively, in another embodiment, raised portion 28 may be slightly offset from the center of body portion 26. Raised portion 28 is integrally positioned on body portion 26 such that the occurrence of peak stresses at the edges of joint 10 is reduced (i.e., by biasing load path 20 to a law stress region of joint 10.

Groove 14, of clamping members 13 and 15, is sized and clamped by either fasteners or other clamping devices (not shown) to engage with and provide a preload on raised portion 28. The preload enables raised portion 28 to be held in position and prevent gapping and/or slipping when external load is applied to first member 12 and/or second member 16. In one embodiment, the preload is applied to connector member 18 in the primary loading direction. When clamping members 13 and 15 are attached to each other using fastener (s) or other clamping devices, clamping members 13 and 15 apply the preload on raised portion 28. This arrangement of clamping members 13 and 15 and the fastener(s) facilitates quick disassembly and re-assembly of clamping members 13 and 15, while still maintaining a strong joint between connector member 18 and second member 16.

Connector member 18 is configured to reduce peak stresses at edges of composite joint 10. Connector member 18 includes any material. In one embodiment, connector member 18 includes a titanium material. Connector member 18 may include, but are not limited to, a metal material, a plastic material, a polymer material, a wood material, a laminate material, or a ceramic material.

When external mechanical loads are applied to joint 10, they are reacted through groove 14. These external loads are then transferred to raised portion or shoulder 28, and then to body portion 26. These external loads are finally transferred to second member 16 through adhesive material 32. In one embodiment, adhesive material 32 includes epoxy adhesive material. In other embodiments, adhesive material 32 may include, but are not limited to, a polyurethane material, a silicone material, an acrylic material, a methacrylate material, or a cyanocrylate material.

Fore and aft faces 33 and 35 of raised portion 28 are located a predetermined distance from fore and aft edges 30 and 31 of integral thin adherent or body portion 26 to reduce peel stresses at these locations. That is, raised portion 28 is located away from high stressed regions (fore and aft edges 30 and 31 of integral thin adherent or body portion 26) of joint 10 in order to move load to central portion 24 (i.e., elastic trough—lowest point of the stress curve) of joint 10. In one embodiment, the width of raised portion 28 is about 15-75% of the width of body portion 26. The lengths of raised portion 28 and/or body portion 26 are sized to locate load path 20 and resulting stresses in the low stress region of adhesive material's elastic trough of the bonded joint, thereby reducing stress concentrations in joint 10.

Figure 1:
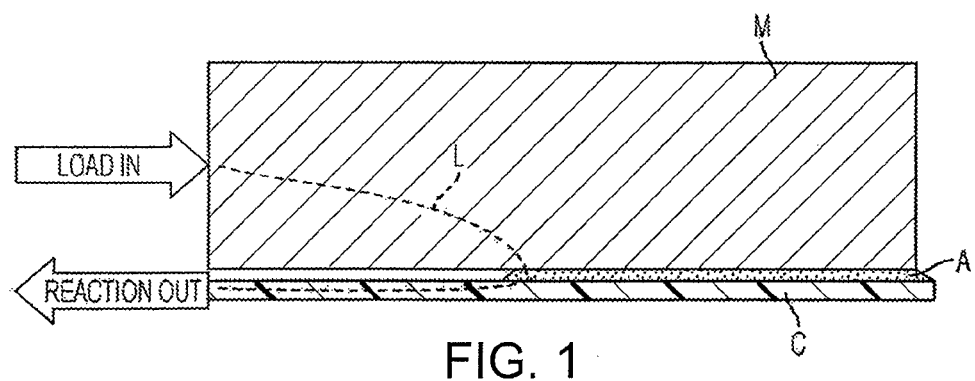
FIG. 1 illustrates a cross-sectional view of a conventional mismatched composite joint.
Figure 3:
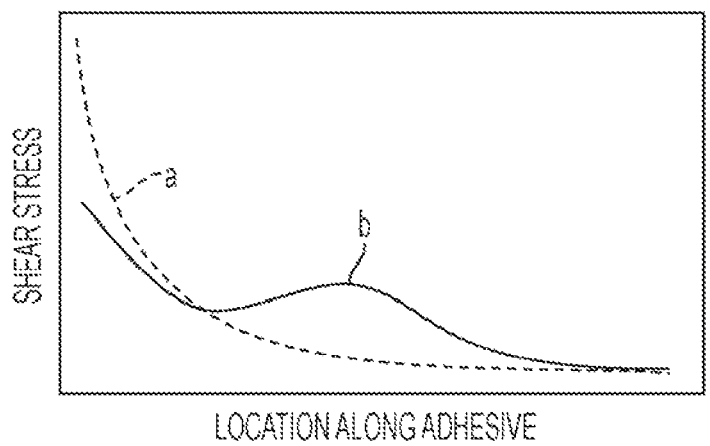
FIG. 3 illustrates a comparison of adhesive shear stresses in the conventional composite joint and the composite joint of the present disclosure, when these joints are subjected to mechanical loading.
Figure 4:
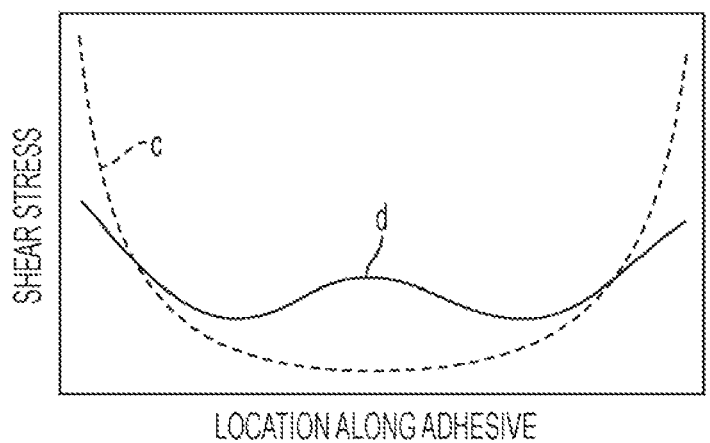
FIG. 4 illustrates a comparison of adhesive shear stresses in the conventional composite joint and the composite joint of the present disclosure, when these joints are subjected to thermal elastic loading.

FIGS. 3 and 4 provide a comparison of adhesive shear stresses in two single lap shear joints of similar geometry, materials and external loadings. Curves a and c represent the adhesive shear stresses in conventional joint (as shown in FIG. 1), while curves b and d represent the adhesive shear stresses in joint 10 (as shown in FIG. 2) of the present disclosure. In the graphs of FIGS. 3 and 4, the Y-axis represents the shear stress in adhesive material 32 and the X-axis represents the location along adhesive material 32 (i.e., location along the length of the bond).

FIG. 3 illustrates the relative shear stress profiles when mechanical loading (applied shear force) is applied to two joints (i.e., conventional joint and joint of the present disclosure).

Curve a is the shear stress profile of the conventional joint when subjected to mechanical loading. As can be seen from curve a, a significant peak in the shear stress profile is located at the leading edge of the joint. This peak stress at the leading edge of the joint generally initiates failure of the joint. That is, this peak stresses reduces the strength of the joint, the efficiency of the joint and the fatigue life of the joint.

In the present disclosure, by adding shoulder-centered sleeve 18 in load path 20 of joint 10, the peak stress at leading edge 30 of the joint 10 is reduced. Shoulder centered sleeve or connector member 18 biases load path 20 towards central portion 24 of joint 10, into the lower stressed "elastic trough" region, away from leading edge 30 of joint 10. This increases the capability of joint 10 by improving the strength, the efficiency and the fatigue life of joint 10.

FIG. 4 illustrates the relative shear stress profiles when thermal elastic loading is applied to two joints (i.e., conventional joint and joint of the present disclosure). These thermal elastic loads are generally induced due to mismatches in stiffness and CTE in the adherents (i.e., adhesive material 32 and second member 16).

Curve c is the shear stress profile of the conventional joint when subjected to thermal-elastic loading. As can be seen from curve c, relatively higher peaks in the shear stress profile are located at the edges of the joint. These peak stresses at the edges of the joint generally initiate failure of the joint.

As can be seen from curve d, the present disclosure locates this larger mismatch (in stiffness and CTE) in central portion 24 of joint 10, far away from the peaks at edges 30 and 31 of joint 10. In one embodiment, peak stresses are minimized at leading edges 30 and 31 by providing smooth stiffness transitions and by moving load paths 20 into the elastic trough (i.e., lowest point on the stress curve) of joint 10, away from the naturally high stress regions (i.e., at the edges of the joint). Joint 10 also reduces peel stresses in underlying second member 16.

The present disclosure allows for structural tuning of joint 10. Specifically, structural tuning of joint 10 is achieved by matching stiffness and coefficients of thermal expansion (CTE) of the two adherents (i.e., connector member 18 and second member 16). The structural tuning of joint 10 is performed to optimize the strength and fatigue life for both mechanical and thermal-elastic loads.

The stiffness is a function of E*t, where E is the Elastic Modulus and t is the thickness of the adherents. In one embodiment, the stiffness of connector member 18 and second member 16 may be matched in a number of ways. In one embodiment, the stiffness of connector member 18 and second member 16 may be matched by changing one or more of the following properties: ply layups, materials and/or thicknesses of either members.

In one embodiment, the Coefficients of Thermal Expansion (CTE) of connector member 18 and second member 16 may be matched by only changing the materials of the connector member 18 and/or second member 16.

Figure 6:
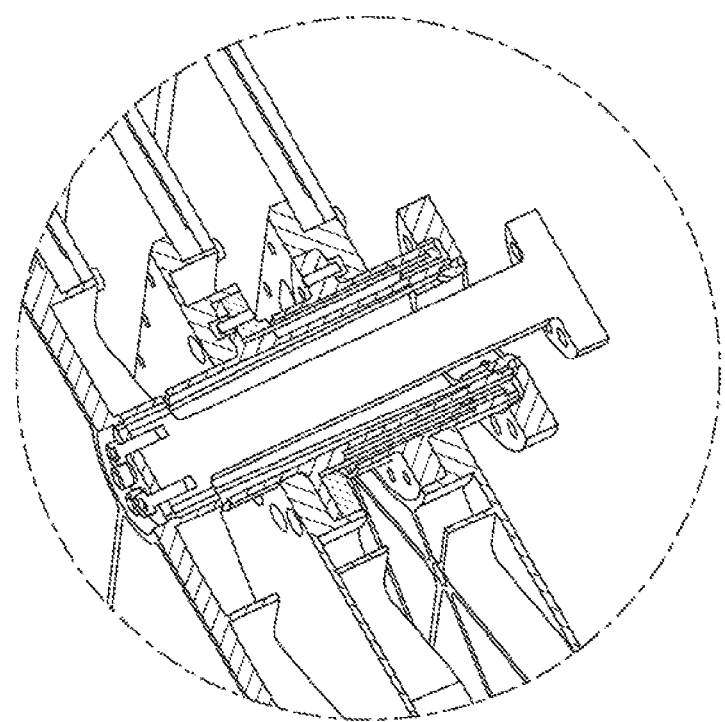
FIG. 6 illustrates an exemplary monopod device used in the cryoradiator shown in FIG. 5.
Figure 5:
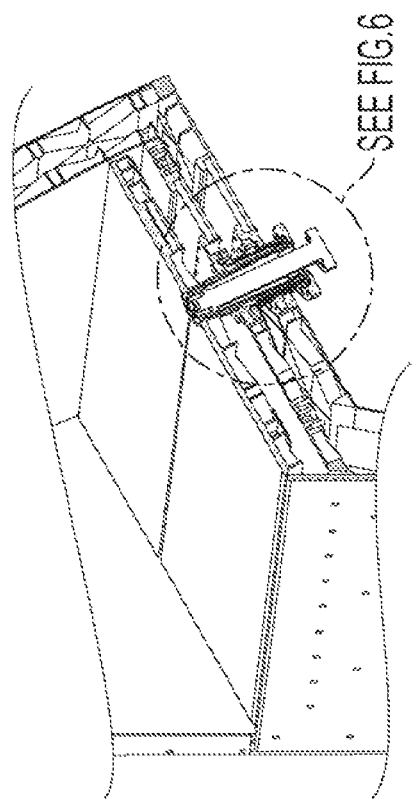
FIG. 5 illustrates a partial cross-sectional view of an exemplary cryoradiator.

FIG. 5 illustrates a partial cross-sectional view of an exemplary cryoradiator that is used, for example, in a satellite and FIG. 6 illustrates an exemplary monopod device used in the cryoradiator shown in FIG. 5.

The cryoradiator is a passive radiator that is configured to operate at very low temperatures and includes multiple thermal stages. For example, in the illustrated embodiment, the cryoradiator includes three thermal stages. Each thermal stage is operated at different temperature. Each stage is separated by a monopod which includes composite-to-metal joints.

The monopod is an important component at the heart of the cryoradiator. The monopod includes thin-walled fiber-reinforced composite tubes bonded to metallic end fittings. Such thin-walled fiber-reinforced composite tubes generally have a low conductivity. The monopod functions both as a mechanical load path and as a thermal isolator between the thermal stages of the radiator, which operates at extremely cold temperatures. As a thermal isolator, the monopod provides a long path between the thermal stages of the radiator. The monopod is often designed to be compact enough to package it in tight confines.

In one embodiment, a monopod device used in a cryoradiator includes metal and composite joints of the present disclosure. When used in the cyroradiator (as shown in FIG. 5), joints 10 of the present disclosure not only structurally support the thermal stages but also thermally isolate them. When used in the cyroradiator (as shown in FIG. 5), joints 10 are not just subjected to both mechanical loads (vibrations) and thermal loads (e.g., during launch of a rocket in which the satellite and hence cryoradiator is transported into orbit).

Figure 7:
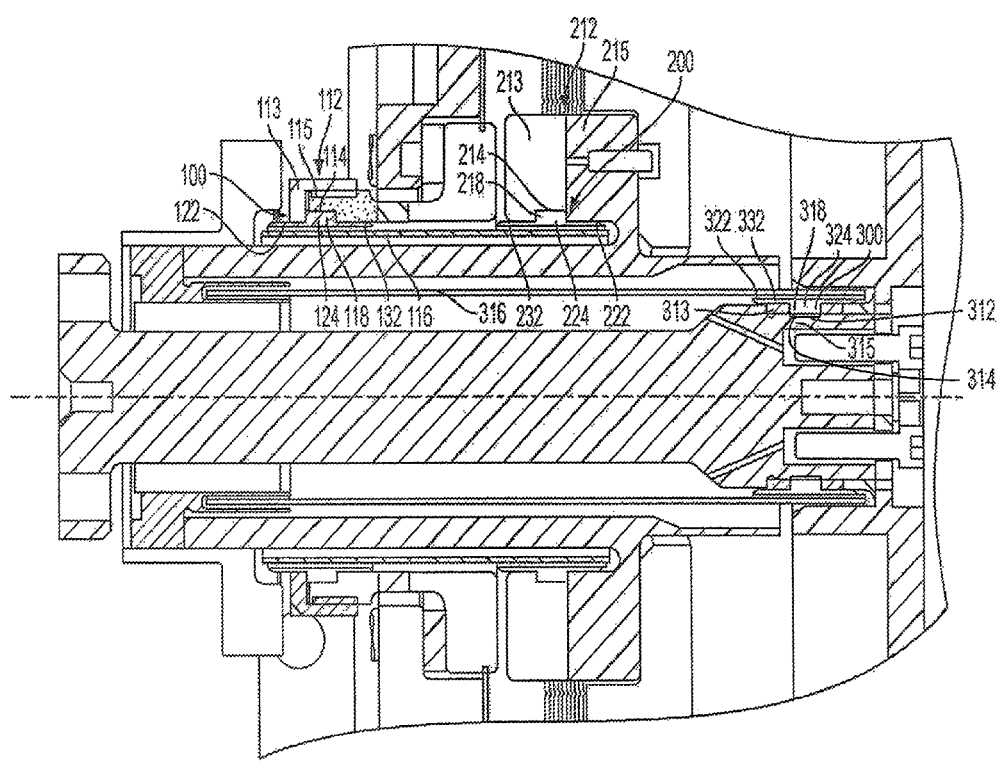
FIG. 7 illustrates a cross-sectional view of the exemplary monopod device (shown in FIG. 6) in which a plurality of composite joints, bonding laminates to metal adherents, formed in accordance with an embodiment of the present disclosure are shown.

FIG. 7 illustrates a cross-sectional view of the exemplary monopod device (shown in FIG. 6) in which a plurality of composite-to-metal joints 100, 200, and 300 formed in accordance with an embodiment of the present disclosure are shown.

In one embodiment, composite-to-metal joints 100 and 200 are used to bond composite member (i.e., thin-walled fiber-reinforced composite tube) 116 to connector members 118 and 218 (i.e., metallic end fittings). In one embodiment, thin-walled fiber-reinforced composite tube 116 are disposed concentrically about thin-walled fiber-reinforced composite tube 316. Metal and composite joint 300 is located on an inner diameter of composite member (i.e., thin-walled fiber-reinforced composite tube) 116, while composite-to-metal joints 100 and 200 are located on an outer diameter of composite member (i.e., thin-walled fiber-reinforced composite tube) 316.

Metal and composite joint 100 includes metal member 112 having groove 114 therein, composite member 116 adjacent to metal member 112, and connector member 118 disposed between composite member 116 and metal member 112. Connector member 118 is received in groove 114 so as to bias load path between metal member 112 and composite member 116 from peripheral portion 122 to central portion 124 of connector member 118. Connector member 118 is bonded to composite member 116 using adhesive material 132. Metal member 112 includes clamping members 113 and 115 that when attached to each other, provide groove 114.

Metal and composite joint 200 includes metal member 212 having groove 214 therein, composite member 116 adjacent to metal member 212, and connector member 218 disposed between composite member 116 and metal member 212. Connector member 218 is received in groove 214 so as to bias load path between metal member 212 and composite member 116 from peripheral portion 222 to central portion 224 of connector member 218. Connector member 218 is bonded to composite member 116 using adhesive material 232. Metal member 212 includes clamping members 213 and 215 that when attached to each other, provide groove 214.

Metal and composite joint 300 includes metal member 312 having groove 314 therein, composite member 316 adjacent to metal member 312, and connector member 318 disposed between composite member 316 and metal member 312. Connector member 318 is received in groove 314 so as to bias load path between metal member 312 and composite member 316 from peripheral portion 322 to central portion 324 of connector member 318. Connector member 318 is bonded to composite member 316 using adhesive material 332. Metal member 312 includes clamping members 313 and 315 that when attached to each other, provide groove 314.

Figure 8:
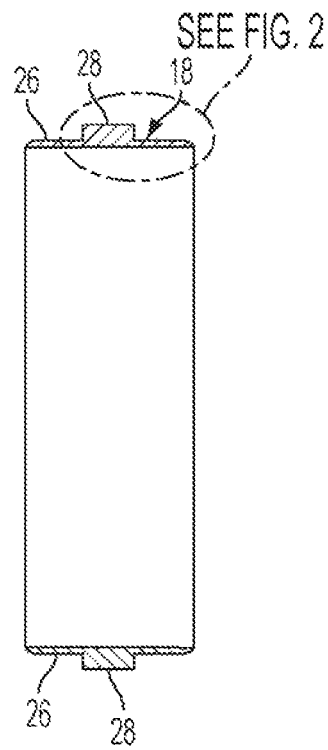
FIG. 8 illustrates a connector member of the composite joint in accordance with an embodiment of the present disclosure.
Figure 9:
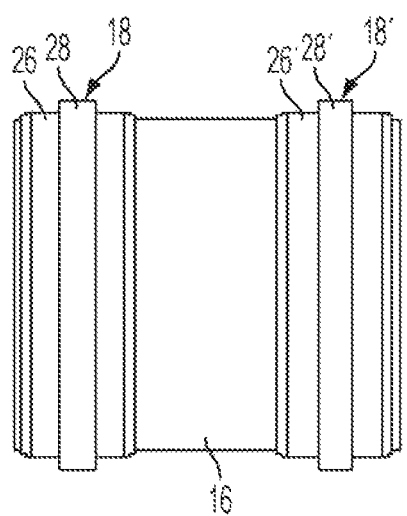
FIG. 9 illustrates two connector members being adhesively bonded to a laminate member of the composite joint in accordance with an embodiment of the present disclosure.
Figure 10:
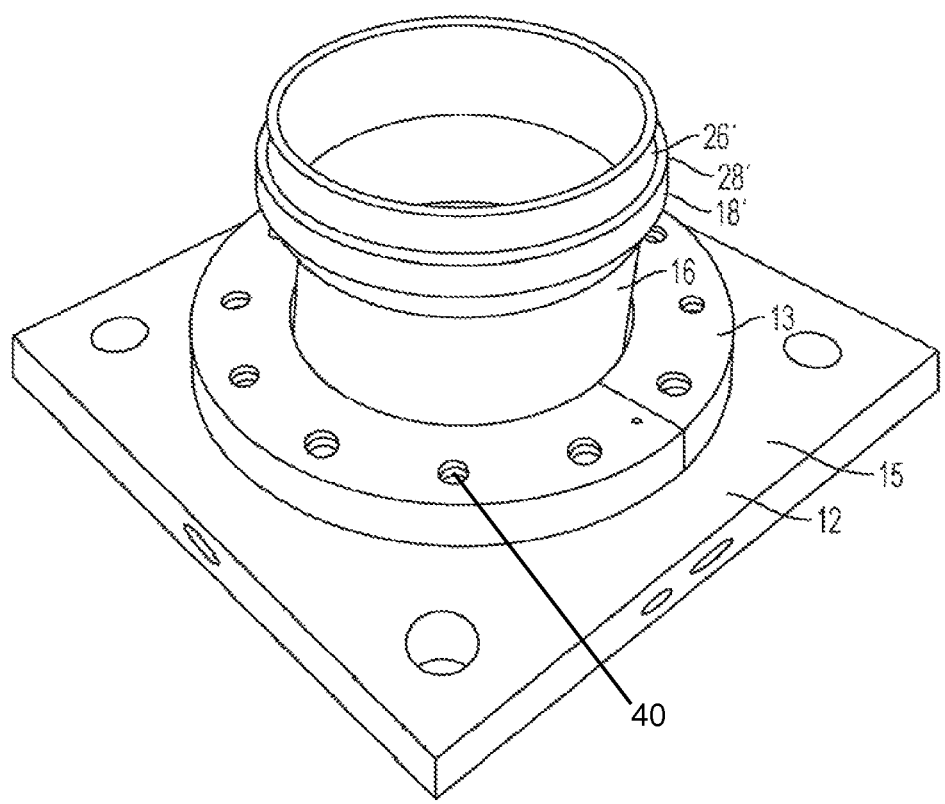
FIG. 10 illustrates an isometric view of the composite joint in accordance with an embodiment of the present disclosure.

FIG. 8 illustrates connector member 18 of composite joint 10 in accordance with an embodiment of the present disclosure. FIG. 9 illustrates connector members 18 and 18' bonded to second member 16 of composite joint 10 in accordance with an embodiment of the present disclosure. FIGS. 8 and 9 also illustrate body portion 26 and raised portion 28 of connector member 18 integral with body portion 26, and body portion 26' and raised portion 28' of connector member 18' integral with body portion 26'. In one embodiment, the width of raised portion 28 is 15 to 75% of the width of body portion 26. As noted above, connector member 18 is bonded to second member 16 using adhesive material 32. FIG. 10 illustrates composite joint 10 (i.e., bottom half only) in accordance with an embodiment of the present disclosure. FIGS. 8-10 clearly illustrate that connector member 18, second member 16, clamping members 13 and 15 include cylindrical cross-sectional configuration or tubular cross-sectional configuration. In other embodiments, connector member 18, second member 16, clamping members 13 and 15 include other cross-sectional configurations.

In one embodiment, as shown in FIG. 10, clamping ring 13 includes opening 40 to receive the fastener, when clamping ring 13 is connected to clamping ring 15. Clamping ring 15 also includes similar opening (not shown) to receive the fastener. In one embodiment, the fastener (not shown) is constructed and arranged to pass through opening 40 of clamping ring 13, and opening of clamping ring 15 to fasten or connect clamping ring 13 and clamping ring 15 together. That is, opening 40 of clamping ring 13 and the opening of clamping ring 15 are aligned with each other to allow the fastener pass through them.

Figure 11:
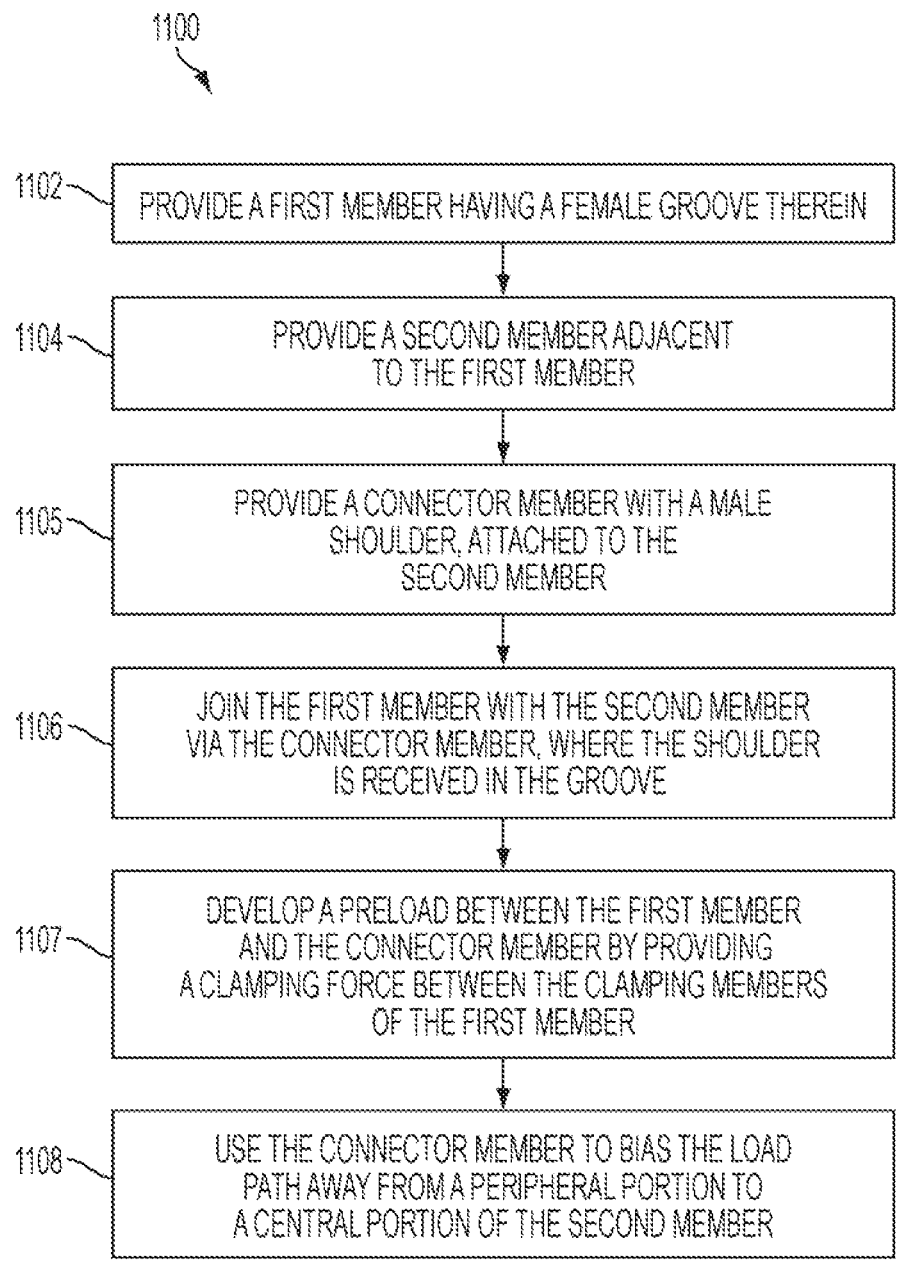
FIG. 11 illustrates a method for joining a first member with a second member in accordance with an embodiment of the present disclosure.

FIG. 11 illustrates a method 1100 for joining first member 12 with second member 16 in accordance with an embodiment of the present disclosure. The method 1100 begins at procedure 1102 in which first member 12 having female groove 14 therein is provided. The method then proceeds to procedure 1104 in which second member 16 is provided adjacent to first member 12. At procedure 1105, connector member 18 with raised portion or male shoulder 28 is provided. Connector member 18 is attached to second member 16, for example, using adhesive material 32.

Next at procedure 1106, first member 12 is joined with second member 16 using connector member 18. As noted above, raised portion or shoulder 28 of connector member 18 is received in groove 14 of clamping members 13 and 15 of first member 12. At procedure 1107, a preload between first member 12 and connector member 18 is developed by providing a clamping force between clamping members 13 and 15 (i.e., two split parts) of first member 12. At procedure 1108, connector member 18 is used to bias a load path between first member 12 and second member 16 from peripheral portion 22 to central portion 24 of the connector member 18.

The joint of the present disclosure is suited for thin-walled, light-weight thermal isolators since the joint is very compact and leverages the benefits of adhesively bonded joints: thin adherents loaded in shear. Since during assembly the joint is bonded in a simple and controlled manner (e.g., two concentric cylinders in a bench top fixture), the joint mitigates many problems associated with manufacturing (e.g., improving workmanship, adhesive voids and squeeze-out, repeatability, alignment, uniform bondline thicknesses, controlled fillets, issues with large members etc.) Also, non-destructive inspection (e.g., ultrasound testing) of the bonded assembly is greatly improved since the adherents are thin and the geometry minimizes the number of noise-generating reflective surfaces, thereby reducing signal attenuation and improving the signal-to-noise ratio.

The composite joint described in the present disclosure can be utilized in a very wide range of applications that require high-strength, efficient and easy to manufacture bonded structural composite joints. For example, the composite joint described in the present disclosure may be used in a) high strength applications including airborne applications, space applications, and pressure vessel applications; b) high fatigue applications including automotive applications, airborne applications and marine applications; c) low weight applications including airborne applications and space applications; d) extreme temperature applications including cryogenic applications; e) compact including airborne and space applications; and f) high production rate applications including automotive applications and airborne applications. Just as an example of extreme temperature applications (including cryogenic applications), the composite metal joint of the present disclosure may be used in satellites that are subjected to extremely harsh environmental conditions of space. The joint of the present disclosure is designed to efficiently operate in extremely low temperature applications, where the joint is subjected to both mechanical (structural) loads and thermal elastic loads. Other applications include composite joints for the following: beams, pipes, shafts, isolators, monopods, booms, masts, rods, columns, shells, plates, tubes, prostheses, etc.

The improved structural composite joint of the present disclosure, thus, solves numerous bonded joint problems in extreme-temperature applications. The improved structural composite joint of the present disclosure: a) optimizes strength and fatigue life for mechanical and thermal-elastic loads; b) minimizes peak stresses by providing smooth stiffness transitions; c) reduces peel stresses (typical failure mode of bonded joints); d) provides a thin-walled thermal isolator; e) provides a low profile and compact sized joint; f) provides ease of manufacturability of the joint; g) provides ease of controlling uniform bond line thicknesses (which in turn improves strength of the joint); h) provides ease of bond line inspections using standard ultrasound methods; i) mitigates risk by testing at part level prior to higher level assembly; j) provides shoulder to locally reinforce composite tube ends (where local buckling may initiate); k) offers ability to disassemble and/or reassemble when clamped with fasteners (versus bonded alone); and l) allows alignment of mating parts through shimming at clamped interfaces.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. A composite joint comprising:
   a first member comprising a metal material and having an aperture with a groove therein;
   a cylindrical second member extending through the aperture of the first member, the second member comprising a fiber reinforced composite material; and
   a single-piece annular connector member, comprising a metal material, disposed between the second member and the first member, wherein the annular connector member comprises an annular body portion and a radially outwardly extending raised portion integral with and centered on the annular body portion, the radially extending raised portion projecting from a first surface of the annular body portion, wherein the annular connector member is adhesively bonded to the second member at a second surface of the annular body portion opposite the first surface, the annular body portion of the annular connector member having at least one beveled peripheral edge, and the radially extending raised portion is received in the groove so as to bias a load path between the first member and the second member from a peripheral portion to a central portion of the annular connector member,
   wherein the first member comprises clamping members that are attached to each other and clamped to the raised portion.

2. The composite joint of claim 1, wherein the raised portion is centered along a primary loading direction of the joint.

3. The composite joint of claim 1, wherein the clamping members, when attached to each other, provide the groove that receives the raised portion therein.

4. The composite joint of claim 3, wherein the groove is constructed and arranged to apply a preload to the connector member along a primary loading direction of the joint.

5. The composite joint of claim 3, wherein an external load on the joint is introduced through the groove, and is then transferred to the second member via the connector member and the adhesive material.

6. The composite joint of claim 3, wherein the groove is formed in at least one of the clamping members.

7. The composite joint of claim 1, wherein the connector member is configured to reduce peak stresses at edges of the composite joint.

8. A monopod device used in a cryoradiator having two or more thermal stages, the monopod device comprising a thermal isolator and a composite joint described in claim 1, wherein the first member comprises a metallic end fitting having a groove therein and the second member comprises a thin-walled fiber-reinforced composite tube, and wherein the thermal isolator is configured to be positioned between the two or more thermal stages of the cryoradiator.

* * * * *